United States Patent [19]
Johansson

[11] Patent Number: 5,086,991
[45] Date of Patent: Feb. 11, 1992

[54] FISHING REEL OF THE MULTIPLIER TYPE

[75] Inventor: Arne Johansson, Mörrum, Sweden

[73] Assignee: ABU Garcia Produktion AB, Svangsta, Sweden

[21] Appl. No.: 604,288

[22] Filed: Oct. 29, 1990

[51] Int. Cl.$^5$ .......................................... A01K 89/015
[52] U.S. Cl. ................................. 242/321; 242/290
[58] Field of Search ................................. 242/290, 321

[56] References Cited

U.S. PATENT DOCUMENTS

| | | | |
|---|---|---|---|
| 728,717 | 5/1903 | Hunter | 242/321 X |
| 1,296,395 | 3/1919 | Hunt | 242/321 X |
| 2,375,098 | 5/1945 | Geczy | 242/156 |
| 3,186,656 | 6/1965 | Venable | 242/321 |
| 3,532,296 | 10/1970 | Murvall | 242/290 |
| 4,422,600 | 12/1983 | Preston | 242/321 X |
| 4,618,106 | 10/1986 | Noda | 242/290 |
| 4,919,362 | 4/1990 | Johansson | 242/290 X |

FOREIGN PATENT DOCUMENTS 4936 of 1904 United Kingdom ............... 242/321

*Primary Examiner*—Katherine Matecki
*Attorney, Agent, or Firm*—Browdy and Neimark

[57] ABSTRACT

A fishing reel of the multiplier type has a frame with a first and a second side plate. A shaft extends through the frame and its ends are carried in support bearings on the side plates. A line spool is rotatably mounted on the shaft by a first and a second ball bearing and has a first and a second inner shoulder facing the first and the second side plate, respectively, the outer ring of the first and of the second ball bearing engaging the first and the second shoulder, respectively. A handle for rotating the line spool is mounted outside the first side plate. A retaining shoulder engages the inner ring of the first ball bearing to maintain its outer ring in engagement against the first shoulder. The second support bearing consists of a sleeve and a bearing body which is axially displaceable in the sleeve and has a bore in which one end of the line spool shaft is mounted. With one end, the bearing body engages the inner ring of the second ball bearing to maintain its outer ring in engagement against the second shoulder. A manually rotatable adjusting knob mounted on the sleeve outside the second side plate is adapted to displace the bearing body axially so as to urge it against the inner ring of the second ball bearing with adjustable force, thus adjusting the resistance to rotation of the line spool.

2 Claims, 2 Drawing Sheets

FISHING REEL OF THE MULTIPLIER TYPE

BACKGROUND OF THE INVENTION

The present invention relates to a fishing reel of the multiplier type.

Known fishing reels of this type generally have a frame with two side plates, a shaft extending through the frame and mounted in rotary bearings in the two side plates, and a line spool which is non-rotatably mounted on the shaft for rotating with it. To prevent the spool, during casting, from rotating at such a high speed that the line cannot be paid out at the same rate but instead rises, forming a so-called birdnest, these prior art fishing reels are provided with a mechanical brake, usually being a friction brake. The braking power of the friction brake can be adjusted by axial displacement of the shaft by means of a turnable knob acting on one end of the shaft. For the same purpose, use is generally made also of a further brake in the form of a centrifugal or a magnetic brake.

The shaft extends in the frame through different components, such as gear wheels and the like, which are mounted on the shaft. By frictional forces, these components affect to a certain extent the rotation of the shaft and, thus, of the spool and limit the possibility of making long casts. If the shaft, the manufacturing tolerances of which are extremely narrow, is slightly skew, for instance as a result of careless handling when servicing the fishing reel, such skewness gives rise to vibrations and noise when the shaft and, thus, the spool are rotating.

To overcome this drawback and provide a fishing reel with which very long casts can be made and in which said noise has been reduced, designers of modern reel types have replaced the shaft mounted in rotary bearings in the side plates with a shaft supported therein by means of support bearings and replaced the line spool non-rotatably mounted on the shaft with a line spool rotatably mounted on the shaft by means of rotary bearings. In this way, the spool will not be braked by components mounted on the shaft, and possible skewness of the shaft will not have the same consequences as in the design first described. However, this new design suffers from the drawback that the shaft sometimes rotates, giving rise to a jarrring sound.

U.S. Pat. No. 4,919,362 describes a fishing reel in which this drawback has been overcome by specially designed resilient means retaining the shaft against rotation.

SUMMARY OF THE INVENTION

The object of the present invention is to further improve the fishing reel according to U.S. Pat. No. 4,919,362 by providing a fishing reel, designed especially for competition purposes, which allows long casts and in which the braking of the line spool can be easily adjusted during a cast. This adjustment aims at successively reducing during a cast the braking effect exerted on the line spool.

According to the invention, this object is achieved by means of a fishing reel of the multiplier type comprising a frame having a first side plate and a second side plate;

a first support bearing element on said first side plate;

a second support bearing element on said second side plate;

a line spool shaft which extends through said frame and the ends of which are supported by said support bearing elements;

a first ball bearing and a second ball bearing axially displaceably mounted on said line spool shaft and each having an outer ring and an inner ring;

a line spool rotatably mounted on said line spool shaft by means of said ball bearings and having a first inner shoulder facing said first side plate, and a second inner shoulder facing said second side plate, the outer ring of said first ball bearing engaging said first shoulder and the outer ring of said second ball bearing engaging said second shoulder;

a spindle parallel to said line spool shaft and extending out through said first side plate;

a handle mounted on said spindle outside said first side plate and adapted to rotate the line spool for retrieving a fishing line attached thereto;

and a retaining shoulder engaging the inner ring of said first ball bearing to maintain the outer ring thereof in engagement with said first shoulder;

said second support bearing element comprising a sleeve and a bearing body axially displaceably mounted in said sleeve and having a bore in which one end of said line spool shaft is mounted, said bearing body engaging with one end the inner ring of said second ball bearing to maintain the outer ring thereof in engagement with said second shoulder;

and manually operable adjusting means being provided for axially displacing said bearing body to urge said one end thereof against the inner ring of said second ball bearing with an adjustable force to adjust the resistance to rotation of the line spool.

In a preferred embodiment, said sleeve has an external thread and said adjusting means comprises a bearing cap having an internal thread and being screwed on said sleeve, the other end of said bearing body engaging the bottom of said bearing cap by the intermediary of resilient means provided in the bearing cap.

The bearing cap preferably has an operating lever for rotating the bearing cap on said sleeve.

BRIEF DESCRIPTION OF THE DRAWINGS

The invention will now be described in more detail with reference to the accompanying drawings.

DESCRIPTION OF THE PREFERRED EMBODIMENT

Figure 1:
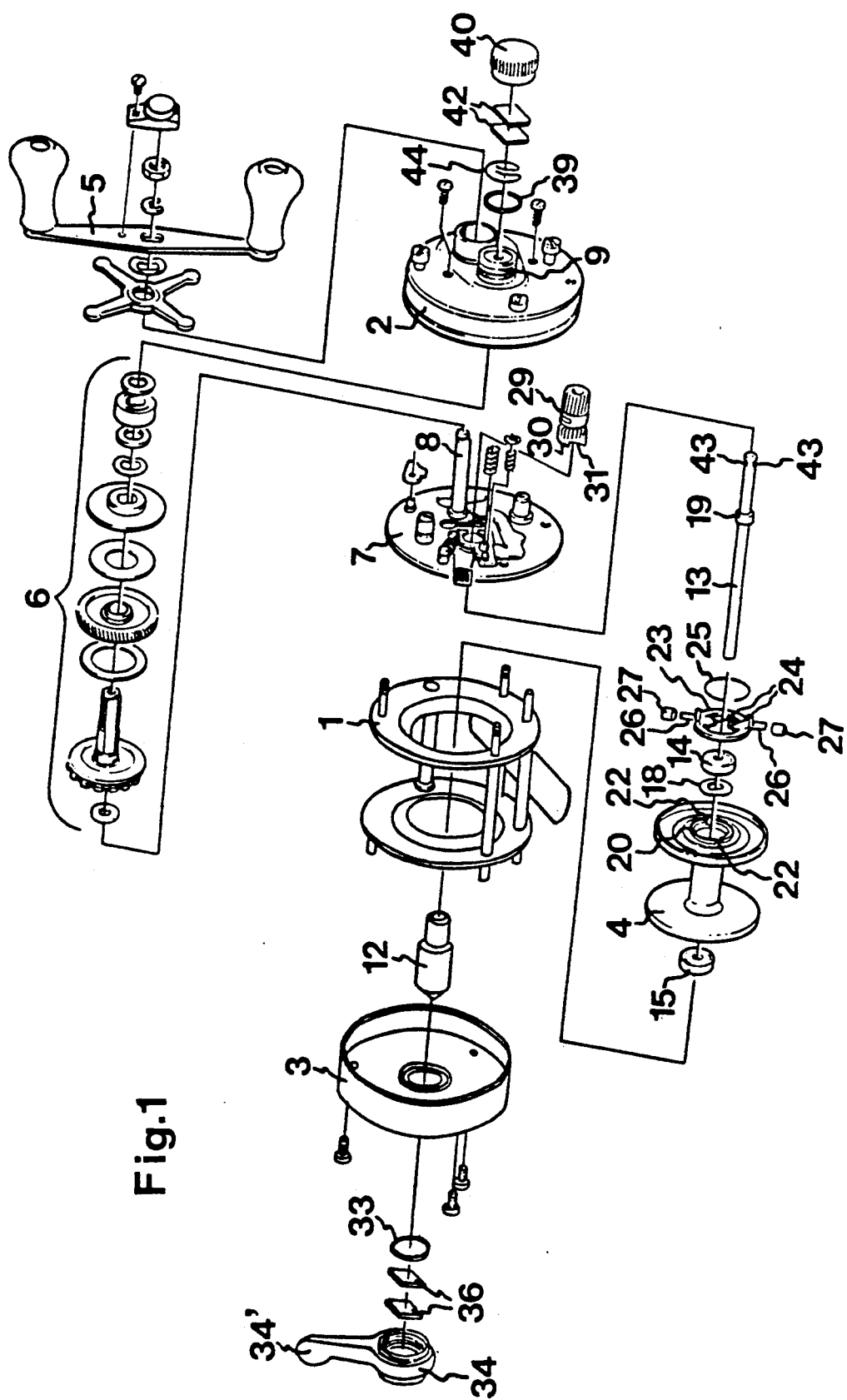
FIG. 1 is an exploded view showing a fishing reel according to the present invention.

The fishing reel of the multiplier type illustrated in the drawings has a frame 1 with detachable side plates 2 and 3, a spool 4 mounted in the frame 1 for receiving a fishing line (not shown), a handle 5 with an associated transmission mechanism 6 for rotating the line spool 4, and a mounting plate 7 fixed on the frame 1 and supporting the handle 5 and the transmission mechanism 6 on a spindle 8.

The handle 5 with the associated transmission mechanism 6, the mounting plate 7 and the other components supported thereby are of conventional type and will not be described in more detail here.

Figure 2:
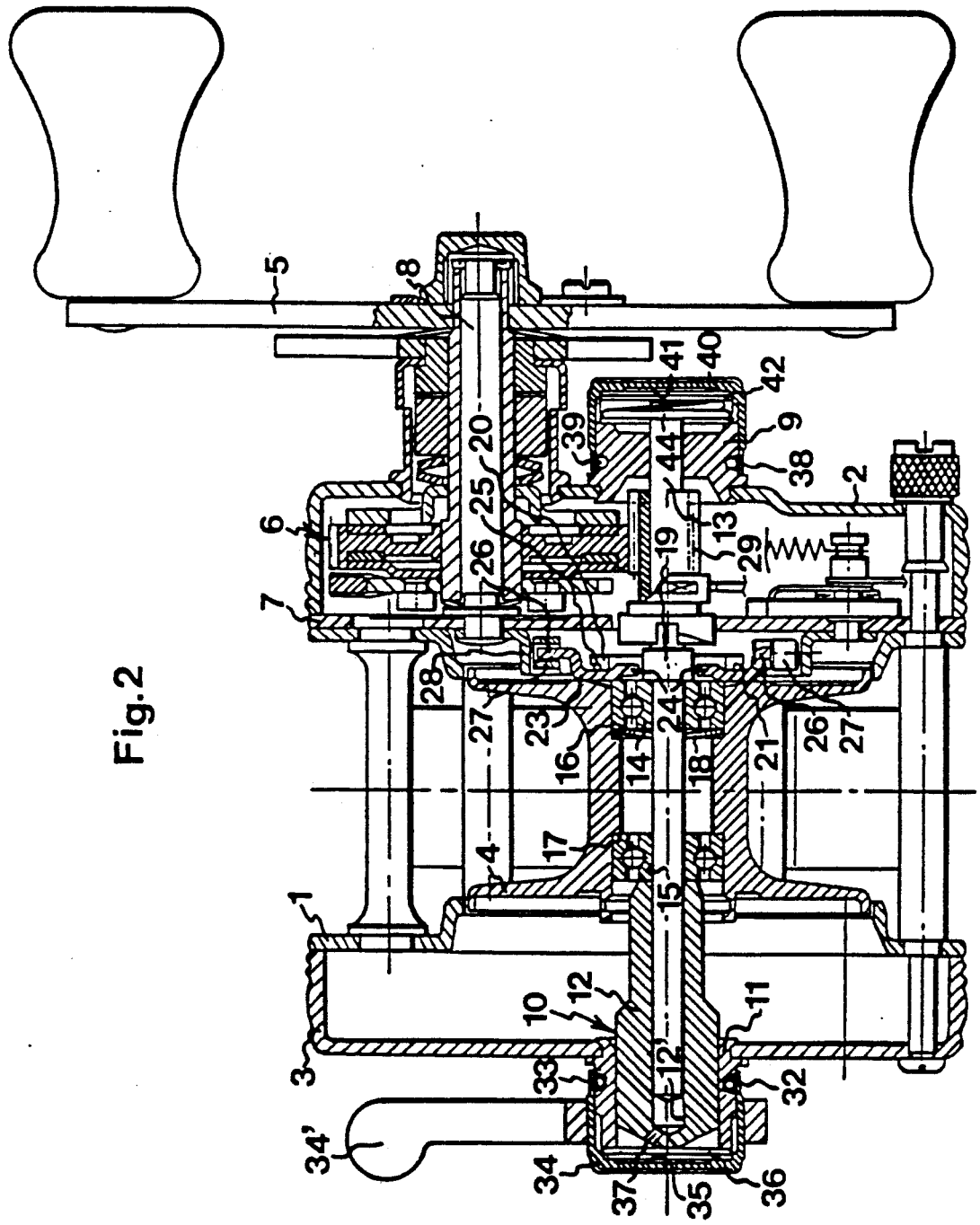
FIG. 2 is an enlarged longitudinal section of the fishing reel shown in FIG. 1.

The right side plate 2 has a central through opening in which a support bearing 9 is fixed. The support bearing 9 is in the form of an externally threaded sleeve projecting from the outside of the side plate 2. The left side plate 3 also has a central through opening in which a support bearing 10 is fixed. The bearing 10 consists of an externally threaded sleeve 11 projecting from the outside of the side plate 3, and a bearing body 12 axially displaceably mounted in the sleeve 11 and having a blind bore 12', the diameter of which is equal to the inner diameter of the sleeve 9. The two support bearings 9 and 10 support the line spool shaft 13 at both ends thereof. As appears from FIG. 2, the shaft 13 extends through the bearing 9 at the right-hand side and into the blind bore 12' at the left-hand side. The diameter of the shaft 13 is only slightly smaller than the inner diameter of the sleeve 9 and the diameter of the blind bore 12'.

The line spool 4 is rotatably supported on the shaft 13 by means of two ball bearings 14 and 15. The outer ring of each ball bearing 14 and 15 abuts with its inner end surface on a shoulder 16 and 17, respectively, within the spool. The outer ring of the right ball bearing 14 abuts on the shoulder 16 by the intermediary of a spring washer 18. The outer end surface of the left ball bearing 15 is located a certain distance inwardly of the left end surface of the line spool 4 while the outer end surface of the right ball bearing 14 is located on a level with the right end surface of the line spool 4. A radially projecting annular shoulder 19 formed on the shaft 13 bears on the outer end surface of the inner ring of the right ball bearing 14.

The line spool 4 has a ring 20 which is coaxial with the line spool and integrally formed therewith and which projects axially from the right end surface of the spool. The ring 20 has an external circumferential groove 21 and two diametrically opposed recesses 22. A clutch ring 23 is provided on the ring 20 and has two radially inwardly projecting diametrically opposed projections 24 engaging in the recesses 22 in the ring 20. The clutch ring 23 is maintained in place on the ring 20 by means of a snap ring 25 disposed in the circumferential groove 21 thereof. The clutch ring 23 further has two radially outwardly projecting diametrically opposed pins 26, each carrying a centrifugal weight 27 slidable on the respective pin 26. When the line spool 4 rotates at a high speed, the centrifugal weights 27 engage the inner circumferential surface of a brake ring 28 fixed on the left-hand side of the mounting plate 7. The centrifugal weights 27 and the brake ring 28 thus serve as a centrifugal brake for the line spool 4.

A gear wheel 29 connected to and driven by the handle 5 via the transmission mechanism 6 is mounted on the shaft 13 between the line spool 4 and the support bearing 9. The end of the gear wheel 29 facing the line spool 4 is cup-shaped with two diametrically opposed lugs 30. When the angler starts turning the handle 5 for retrieving the line, the gear wheel 29 is moved to the left from the position shown in FIG. 2 in a known manner not described in more detail here, whereby the shoulder 19 on the shaft 13 is received in the cup of the gear wheel 29 and the lugs 30 are brought into driving engagement with the projections 24 of the clutch ring 23. In order to ensure that this driving engagement takes place in a reliable and uniform manner during the rotation of the gear wheel 29, each lug 30 is preceded by an inclined cam surface 31. Upon continued rotation of the handle 5, the line spool 4 is rotated about the shaft 13.

The sleeve 11 has an external circumferential groove 32 accommodating an O-ring 33. An internally threaded bearing cap 34 is screwed on the sleeve 11. The bearing cap 34 has an internal central recessed portion 35 in its bottom. Two spring leaves 36 of tin bronze bridging the recessed portion 35 are placed in the bearing cap 34. The left end of the bearing body 12 abuts on the bottom of the bearing cap 34 by the intermediary of the spring leaves 36, and its right end abuts on the outer end surface of the inner ring of the left ball bearing 15. When the bearing cap 34 is screwed further onto the sleeve 11, it will move the bearing body 12 to the right so as to urge the ball bearing 15 and, thus, the line spool 4 to the right. The bearing body 12 is displaced relative to the shaft 13 and, to prevent an overpressure from building up at the bottom of the blind bore 12', has an air vent 37 formed therein, which connects the blind bore 12' with the interior of the bearing cap 34. A radial lever 34' is fixed to the bearing cap 34 to facilitate rotation thereof.

The right support bearing 9 has an outer circumferential groove 38 in which an O-ring 39 is mounted. An inwardly threaded bearing cap 40 is screwed on the support bearing 9. The bearing cap 40 has an internal central recessed portion 41 in its bottom. Two spring leaves 44 of tin bronze bridging the recessed portion 41 are placed in the bearing cap 40.

In its end located in the bearing cap 40, the shaft 13 has two circumferential diametrically opposed grooves 43, the bottoms of which are parallel to each other and form a flat on the shaft. A resilient member 44 which bears on the support bearing 9 and is urged against the inner circumferential surface of the bearing cap 40 so as to be non-rotatably retained therein, engages in the grooves 43 of the shaft 13 in order, by engaging the flat thereon, to retain the shaft 13 against rotation and, by pressing against the outer side wall of the grooves, to urge the shaft to the right, such that its right end bears on the bottom of the bearing cap 40 by the intermediary of the spring leaves 42. When the bearing cap 40 is screwed further onto the support bearing 9, it will displace the shaft 13 to the left against the action of the resilient member 44, the shoulder 19 on the shaft 13 urging the ball bearing 14 and hence the line spool 4 to the left.

The line spool 4 is centered in the frame 1 by screwing the bearing caps 34 and 40 to centering position on the respective sleeve 11 and 9, respectively.

When the line spool 4 is rotating at high speed, it is braked in the manner described above by means of the centrifugal brake 27, 28 whose braking power decreases with a decreasing speed of rotation of the line spool 4. Braking of the line spool 4 is also brought about by screwing the bearing cap 34 further onto the sleeve 11 away from its centering position so as to urge the bearing body 12 to the right. The force exerted by the bearing body 12 on the inner ring of the ball bearing 15 is transmitted by the bearing balls to the outer ring of the bearing 15 and, by the shoulders 17 and 16 of the line spool 4, on to the outer ring of the ball bearing 14. Via the balls of the bearing 14, said force is finally transmitted to the inner ring thereof against which the shoulder 19 on the shaft 13 abuts. The greater this force acting on the ball bearings 14 and 15 is, the greater is the friction of the ball bearings and the higher the resistance to rotation of the ball bearings. Thus, by rotating the bearing cap 34, it is possible to adjust the braking of the line spool produced by the ball bearings 14 and 15. By turning the lever 34', e.g. with the thumb, so as to slightly unscrew the bearing cap 34 during a cast, it thus is possible to gradually reduce the braking effect exerted on the line spool 4 by the ball bearings 14 and 15 during the cast.

What I claim and desire to secure by Letters Patent is:

1. A fishing reel of the multiplier type, comprising
a frame having a first side plate and a second side plate;
a first support bearing element on said first side plate;
a second support bearing element on said second side plate;
a line spool shaft extending through said frame and having two ends which are supported by said support bearing elements;
a first ball bearing and a second ball bearing axially displaceably mounted on said line spool shaft and each having an outer ring and an inner ring;
a line spool rotatably mounted on said line spool shaft by means of said ball bearings and having a first inner shoulder facing said first side plate, and a second inner shoulder facing said second side plate, the outer ring of said first ball bearing engaging said first shoulder and the outer ring of said second ball bearing engaging said second shoulder;
a spindle parallel to said line spool shaft and extending out through said first side plate;
a handle mounted on said spindle outside said first side plate and adapted to rotate the line spool for retrieving a fishing line attached thereto;
and a retaining shoulder formed on the line spool shaft and engaging the inner ring of said first ball bearing to maintain the outer ring thereof in engagement with said first shoulder;
said second support bearing element comprising a sleeve, having an external thread, and a bearing body axially displaceably mounted in said sleeve and having a bore in which one end of said line spool shaft is mounted, said bearing body engaging with one end the inner ring of said second ball bearing to maintain the outer ring thereof in engagement with said second shoulder;
manually operable adjusting means, comprising a bearing cap having an internal thread and being screwed on said sleeve, being provided for axially displacing said bearing body to urge said one end thereof against the inner ring of said second ball bearing with an adjustable force to adjust the resistance to rotation of the line spool, the other end of said bearing body engaging the bottom of said bearing cap by the intermediary of resilient means provided in the bearing cap.

2. Fishing reel as claimed in claim 1, wherein said bearing cap has an operating lever for rotating the bearing cap on said sleeve.

* * * * *